United States Patent [19]

Lightle et al.

[11] Patent Number: 5,207,852
[45] Date of Patent: May 4, 1993

[54] METHOD FOR MAKING PERMEABLE RETROREFLECTIVE SHEETING

[75] Inventors: Vera L. Lightle, Hudson, Wis.; Johann F. Petersen, Grevenbroich, Fed. Rep. of Germany; Wallace K. Bingham, North St. Paul, all of Minn.

[73] Assignee: Minnesota Mining and Manufacturing Company, St. Paul, Minn.

[21] Appl. No.: 851,864

[22] Filed: Mar. 16, 1992

Related U.S. Application Data

[62] Division of Ser. No. 651,121, Feb. 6, 1991, Pat. No. 5,128,804.

[51] Int. Cl.⁵ ............................................. B29C 65/02
[52] U.S. Cl. ................................. 156/230; 156/298; 156/303.1; 156/308.2
[58] Field of Search ................. 156/63, 230, 249, 298, 156/303.1, 308.2; 264/271.1, 277, 1.9, 131; 359/514, 515, 518, 534, 535, 536, 538; 428/311.5, 283, 317.9; 427/180

[56] References Cited

U.S. PATENT DOCUMENTS

| Re. 30,892 | 3/1982  | Bingham et al. | 428/241 |
|---|---|---|---|
| T987,003   | 10/1979 | Johnson et al. | |
| 2,379,741  | 1/1943  | Palmquist      | 88/82   |
| 2,543,800  | 12/1947 | Palmquist et al. | 88/82 |
| 2,668,787  | 2/1954  | Schramm        | 428/283 |
| 3,172,942  | 3/1965  | Berg           | 88/82   |
| 3,190,178  | 6/1965  | McKenzie       | 88/82   |
| 3,413,058  | 11/1968 | Tung et al.    | 350/105 |
| 3,700,305  | 10/1972 | Bingham        | 350/105 |
| 3,700,478  | 10/1972 | Bingham        | 117/28  |
| 3,758,192  | 9/1973  | Bingham        | 350/105 |
| 3,790,431  | 2/1974  | Tung           | 161/3.5 |
| 3,877,786  | 4/1975  | Booras et al.  | 350/105 |
| 4,102,562  | 7/1978  | Harper et al.  | 350/105 |
| 4,263,345  | 4/1981  | Bingham        | 427/163 |
| 4,418,110  | 11/1983 | May et al.     | 428/143 |
| 4,897,136  | 1/1990  | Bailey         | 156/298 |

FOREIGN PATENT DOCUMENTS 1358987  7/1974  United Kingdom ................ 264/131

OTHER PUBLICATIONS

ASTM D737-75, Standard Test Method for Air Permeability of Textile Fabrics.

Primary Examiner—Caleb Weston
Assistant Examiner—Steven D. Maki
Attorney, Agent, or Firm—Gary L. Griswold; Walter N. Kirn; Robert H. Jordan

[57] ABSTRACT

Flexible, self-supporting, air-permeable retroreflective sheeting comprising a two-sided, self-supporting, air-permeable web of thermoplastic filaments with retroreflective elements partially embedded in the filaments on one side of the web. On the other side of the web, the surfaces of the filaments are substantially free of retroreflective elements. In some embodiments, the web may be used as a bonding agent to secure the sheeting to a desired substrate.

11 Claims, 1 Drawing Sheet

METHOD FOR MAKING PERMEABLE RETROREFLECTIVE SHEETING

CROSS-REFERENCE TO RELATED APPLICATIONS

This application is a divisional of U.S. application Ser. No. 07/651,121 filed Feb. 6, 1991 now U.S. Pat. No. 5,128,804.

FIELD OF THE INVENTION

The present invention relates to retroreflective sheetings and methods for making same, particularly air-permeable retroreflective sheetings.

BACKGROUND OF THE INVENTION

Articles of clothing with retroreflective portions have been made in several forms in the past, primarily because of the need to make pedestrians and pets more visible at night to operators of motor vehicles. For instance, strips of retroreflective material may be sewn onto clothing to improve the visibility of the wearer. U.S. Pat. No. 3,172,942 (Berg) discloses retroreflective dry transfer assemblies comprising a layer of adhesive by which the assembly is secured to a substrate, e.g., an article of clothing. Other retroreflective articles of clothing have been made with cloth to which retroreflective elements have been adhered as disclosed in U.S. Pat. Nos. 4,263,345 (Bingham) and Re. 30,892 (Bingham et al.). U.S. Pat. No. 3,758,192 (Bingham) discloses a fabric with a retroreflective layer adhered thereto with adhesive. U.S. Pat. No. 4,263,345 (Bingham) discloses application of a coating composition to fabrics to impart retroreflective properties thereto. U.S. Pat. No. 4,102,562 (Harper et al.) discloses retroreflective transfers which can be applied to garments and other substrates.

Many of the known techniques for imparting retroreflective properties to clothing and fabrics are relatively expensive and some impart only limited degrees of retroreflection. Another problem with many techniques for imparting retroreflective properties is that the finished article is uncomfortable to wear because it is excessively heavy, impermeable, and/or stiff. In some instances the retroreflective elements may be unduly subject to being abraded away.

U.S. Pat. No. 3,790,431 (Tung) discloses a light-transmissive retroreflective sheeting comprising an open web of filaments encased around their whole circumference by a layer of binder material securing a monolayer of retroreflective microspheres.

SUMMARY OF INVENTION

The present invention provides inexpensive, novel retroreflective sheetings which are air-permeable and typically highly flexible. It also provides novel methods for making such sheetings.

In brief summary, the retroreflective sheetings provided herein comprise a two-sided, self-supporting, air-permeable web of thermoplastic filaments with retroreflective elements partially embedded in the filaments on one side of the web. On the other side of the web, the surfaces of the filaments are substantially free of retroreflective elements. The sheetings can be made in very flexible form. The sheetings provided herein are typically self-supporting, making them of great utility for use as retroreflective fabrics. Comfortable, breathable clothing can be made with the sheetings provided herein.

Briefly summarized, the novel retroreflective sheetings provided herein may be made by:
a) providing a monolayer of retroreflective elements releasably secured to a temporary carrier sheet;
b) heat-laminating an air-permeable web of thermoplastic filaments to the retroreflective elements; and
c) stripping away the carrier sheet.

The sheetings provided herein may be die-cut to form desired indicia, e.g., letters or numbers, for direct attachment to clothing articles. In addition to imparting sheet-like structural integrity, the thermoplastic web may be used to secure the sheeting to a desired substrate, e.g., as an iron-on patch to an article of clothing. Alternatively, the sheetings provided herein may be secured to a substrate by intermediate adhesive or mechanical means such as sewing. Retroreflective sheetings of the invention can be colored to impart desired ambient color and appearance and yet provide bright retroreflective properties.

BRIEF DESCRIPTION OF THE DRAWINGS

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
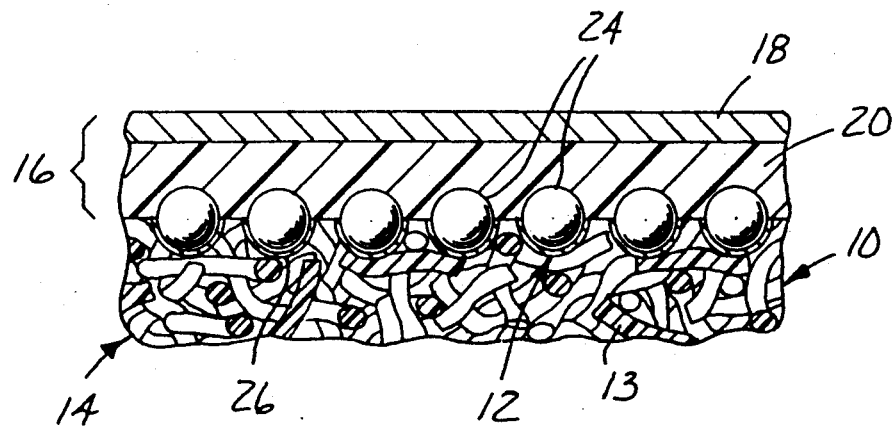
FIG. 1 is a cross-sectional schematic illustration of a portion of one embodiment of a retroreflective sheeting of the invention.

Referring to FIG. 1, retroreflective sheetings 10 of the invention comprise a monolayer of retroreflective elements 12 partially embedded in thermoplastic filaments 13 on one side of air-permeable web 14. As illustrated, temporary carrier 16 has not yet been removed.

Figure 2:
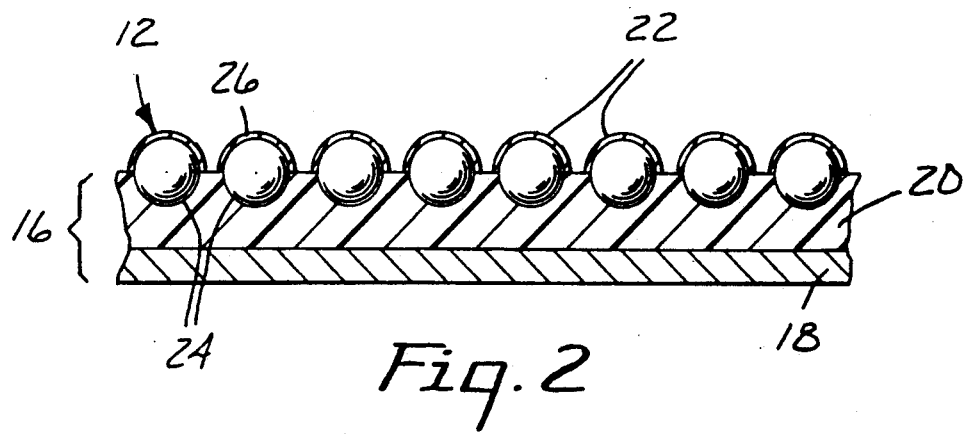
FIG. 2 is a cross-sectional schematic illustration of a portion of an intermediate construction of one embodiment of a sheeting of the invention during fabrication.

Referring to FIG. 2, a sheeting of the invention is made by:
a) providing a monolayer of retroreflective elements 12 releasably secured to temporary carrier sheet 16, preferably with a substantial portion of elements 12 oriented such that their front surfaces are in contact with carrier sheet 16;
b) heat-laminating, e.g., with application of heat and pressure, an air-permeable web of thermoplastic filaments (not shown) to protruding surfaces 22 of retroreflective elements 12, the heat-laminating being done in such a manner that the web retains a substantial portion of its permeability while retroreflective elements 12 are partially embedded into the filaments; and
c) stripping away carrier sheet 16 such that a substantial majority, preferably substantially all, of retroreflective elements 12 are retained on the thermoplastic web.

Typically, the temporary carrier sheet comprises a thermoplastic layer in which the retroreflective elements are partially embedded, e.g., by heating, to releasably secure them in position. An illustrative carrier sheet 16 is shown in FIGS. 1 and 2 and comprises paper or polymer sheet 18 coated on at least one side with layer 20 of thermoplastic material, e.g., low density polyethylene.

Carrier 16 should provide sufficient mechanical strength characteristics, e.g., tensile strength, tear resistance, etc., and substantially retain such characteristics throughout the conditions to which it is exposed during the fabrication process, that it can be used throughout the process to secure, hold in desired arrangement, and then release retroreflective elements 12 as desired. In some instances, carrier 16 may contain one or more release agents, or the surface of carrier 16 to which retroreflective elements 12 are temporarily secured may be treated with one or more release-modifying treatments, to provide desired release properties to reflective elements 12 The surfaces of retroreflective elements 12 may be treated with release-modifying treatment if desired.

In typical embodiments, retroreflective elements 12 are microspheres 24 having substantially hemispherical reflective layers 26 thereon. In such instances, the process of providing a monolayer of such retroreflective elements 12 on carrier sheet 16 often comprises:
 a) cascading a monolayer of microspheres 24 onto the thermoplastic surface of carrier sheet 16, typically preferably packed in their closest hexagonal packing arrangement so as to maximize the retroreflective brightness of the resultant sheeting;
 b) partially embedding microspheres 24 into the thermoplastic surface by applying heat and/or pressure; and
 c) applying reflective layer 26 to the exposed surfaces of microspheres 24.

An advantage of this technique is that, as is preferred, retroreflective elements 12 in the resultant sheeting are typically substantially uniformly oriented such that high brightness retroreflection is provided. It should be understood, however, that retroreflective elements 12 need not be substantially uniformly oriented in this fashion in order to attain other advantages of the invention.

Microspheres 24 having reflective layers 26 typically provide satisfactory levels of retroreflective brightness over a wide range of incidence angles, i.e., the angles at which the light strikes the sheeting, a property sometimes referred to as "angularity". However, it will be understood that retroreflective elements of other configurations may be used in accordance with the teachings of the present invention.

When microspheres 24 are used as retroreflective elements in sheetings of the present invention, the microspheres are preferably substantially spherical in shape in order to provide the most uniform and efficient retroreflection. Also, the microspheres are typically preferably substantially transparent so as to minimize the amount of incident light absorbed thereby, and thus thereby optimize the amount of light which is retroreflected by the sheeting. Furthermore, the microspheres are typically preferably substantially colorless; although, in some instances, the microspheres may be colored to produce special effects if desired. Microspheres used herein may be made from glasses or synthetic resins having the optical properties and physical characteristics taught herein. Glass microspheres are typically preferred because they typically cost less and exhibit greater durability than polymeric microspheres.

Microspheres used herein will typically have an average diameter of between about 40 and about 200 microns. Microspheres which are substantially smaller than this range may tend to provide lower levels of retroreflection because of diffraction effects, whereas microspheres which are substantially larger than this range may tend to impart undesirably high thickness to resultant sheetings or may tend to be more easily dislodged from a sheeting when subjected to abrasive forces. Typically, it is preferred that the microspheres used in a sheeting be of substantially uniform size in order to facilitate fabrication of the sheeting and increase uniformity of the properties thereof.

In a typical embodiment, the retroreflective elements are between about 60 and about 80 microns in diameter and the filaments of the web are between about 20 and 40 microns in diameter. During lamination, with the retroreflective elements becoming partially embedded therein, the filaments deform. For instance, in the case of a web wherein the filaments are initially substantially circular in cross-section, following lamination, the filaments may be substantially oblong in cross-section as well as deformed around the retroreflective elements. Surprisingly, however, it has been found that webs can be used to form retroreflective sheetings as described herein and still retain high air-permeability and flexibility. No particular ratio of average size of retroreflective element to average size of filaments is required in so long as the web can maintain its integrity and the filaments can securely bond the retroreflective elements during removal from the temporary carrier and during use of the resultant retroreflective sheeting.

The refractive index of microspheres used herein is typically preferably between about 1.70 and about 2.0, and more preferably between about 1.85 and about 1.92, the range typically considered to be most useful in microsphere-based retroreflective articles where the front surfaces of the microspheres are exposed or air-incident. It will be understood, however, that microspheres having refractive indices outside this range may be used in accordance with the present invention. For instance, microspheres having refractive indices of about 2.5 will provide retroreflection when their front surfaces are covered with water, whereas microspheres having a refractive index of about 1.9 will typically be substantially less effective retroreflectors under such conditions. Accordingly, for embodiments which are to be used under conditions where the front surface of the sheeting is likely to have water thereon, e.g., life jackets or rainwear, a mixture of microspheres having refractive indices of about 1.9 and about 2.5 may be used to provide effective retroreflection under both dry and wet conditions.

As mentioned above, microsphere retroreflective elements 24 have substantially hemispherical reflective layers 26 thereon. Among the variety of materials which are known for this purpose are vacuum-deposited or vapor-coated metal coatings, such as aluminum or silver; chemically-deposited metal coatings, such as silver; metal-coated plastic films; metal flakes, such as aluminum or silver, in a binder; dielectric coatings; and nacreous pigment particles in a binder. Aluminum or silver coatings are typically preferred because they tend to provide the highest retroreflective brightness. The retroreflective color of silver coatings is sometimes preferred to that of aluminum coatings, but aluminum coatings are normally more preferred overall because silver reflective coatings typically tend to suffer more severe and more rapid degradation in outdoor exposure than do aluminum coatings. U.S. Pat. No. 3,700,305 (Bingham), which is incorporated herein by reference, discloses dielectric mirrors or coatings consisting of multiple layers of materials with alternating refractive index that may be used as reflective layers 26 in sheetings of the invention. U.S. Pat. No. 3,758,192 (Bingham), which is incorporated herein by reference, discloses retroreflective elements comprising microspheres and layers containing nacreous pigment particles that may be used as retroreflective elements in sheetings of the invention.

Following arrangement of a monolayer of reflective elements 12 on carrier 16, air-permeable web 14 is laminated to protruding portions 22 of reflective elements 12 as shown in FIG. 1.

Web 14 is made of thermoplastic filaments 13, such that they can be softened and laminated., e.g., with heat and pressure applied, to elements 12 protruding from carrier 16 and thereby secured thereto, e.g., after cooling. Typically, the web will have a crystallite melting point or melting temperature ($T_m$) of between about 40° C. and about 250° C., and preferably between about 95° C. and about 205° C. It will be understood that webs having $T_m$s outside these ranges may be used in some embodiments. If the web has a $T_m$ which is too low, the resultant sheeting may not exhibit desired stability in certain environments where it is overheated, e.g., if kept in an automobile trunk during summer months, and be subject to loss of retroreflective elements and other degradation. If the web has a $T_m$ which is too high, it may be difficult to soften the web sufficiently to flow effectively around the retroreflective elements and the resultant sheeting may be more highly susceptible to loss of retroreflective elements when subjected to abrasive forces.

Preferably, filaments 13 will have a sufficiently high melt index that they will flow under heat and pressure, if used, to bond securely to retroreflective elements 12 after cooling, but a sufficiently low melt index that they will not flow to such an extent that the air-permeability of web 14 is reduced to an undesirable degree, e.g., to less than about 0.2 feet$^3$/minute (5 liters/minute) upon lamination to retroreflective elements. The useful range of melt index of filaments 13 of web 14 will depend in part upon such factors as the initial air-permeability of web 14, the parameters under which lamination is performed, including, for example, temperature, pressure, and time, and the conditions under which the resultant retroreflective article is to be used. Determination of useful melt index range of web 14 for use in a particular application may be readily made by those skilled in the art with trial and error. Typically, webs 14 made of filaments 13 having a melt index between about 2 and about 60 will be useful for many applications, with those having a melt index between about 15 and about 30 typically being preferred. Illustrative examples of materials which may be useful for making web 14 include polyurethanes, polyethylene, ethylene/vinyl acrylate copolymers, etc.

Typically, web 14 has such permeability and thermoplastic characteristics that after lamination to elements 12 it will still have an air-permeability of at least about 0.2 feet$^3$/minute (5 liters/minute), preferably at least about 0.5 feet$^3$/minute (14 liters/ minute), and more preferably at least about 2.0 feet$^3$/minute (55 liters/minute). In some embodiments, substantially greater air-permeability is desired and achieved. Useful permeability and thermoplasticity characteristics for a particular embodiment will be dependent in part upon the pressures, temperatures, and speed of the lamination process as well as the properties desired of the resultant sheeting, and may be readily determined by trial and error.

Web 14 may be a non-woven, woven, knit, or spun-bonded web, microporous film, etc. Non-woven webs are typically preferred as they are typically the most easily formed, the lowest cost, and available in a wide variety of formulations and basis weights. Also, it is believed that non-woven webs will tend to retain desired properties such as permeability, tensile strength, elasticity, etc. to a greater degree than will webs of other types.

Filaments of web 14 should comprise a material which will adhere to retroreflective elements 12, both more strongly than does temporary carrier 16 and sufficiently strongly to resist loss of retroreflective elements 12 due to abrasive and other forces to which the resultant article is subjected. Accordingly, filaments 13 may be made up of material which inherently exhibits desired adherence, or they may be treated, e.g., with exposure to corona treatment or plasma discharge, to enhance adherence, or adhesion promoting agents may be incorporated therein.

The optimum conditions of temperature, pressure, and time for lamination of a particular web to retroreflective elements depends in part upon the characteristics of the filaments, retroreflective elements, and structure of the web. Useful conditions for lamination for a particular embodiment may be readily determined by trial and error.

If desired, web 14 may be colored, e.g., by introduction of coloring agents such as dyes or pigments therein, to impart a desired ambient color appearance, e.g., bright or fluorescent colors, to the resultant sheeting.

Illustrative examples of materials which can be used to make thermoplastic webs useful herein include Eastman Kodak Co.'s FA-300, K. J. Quinn Co.'s QUINN PS200-455, and B. F. Goodrich Co.'s ESTANE 5713.

After web 14 is laminated to retroreflective elements 12, partially embedding retroreflective elements 12 into the filaments on one side of web 14, carrier 16 may be stripped away to yield retroreflective sheeting 10. Alternatively, carrier 16 may be left in place for added support during handling and conversion of sheeting 10, e.g., cutting into desired shapes such as strips, alphanumeric characters, or aesthetically determined contours.

Because the web comprises retroreflective elements on only one side and because the elements are embedded directly into the filaments with no intermediate binder material, it retains higher flexibility than if such elements had been applied to both sides or essentially surrounding the constituent filaments of the web, as in the sheeting disclosed in the aforementioned U.S. Pat. No. 3,790,431. In addition, because the filaments are exposed on the rear or second side of the web, their thermoplastic character may be used to secure the sheeting to a substrate.

Figure 3:
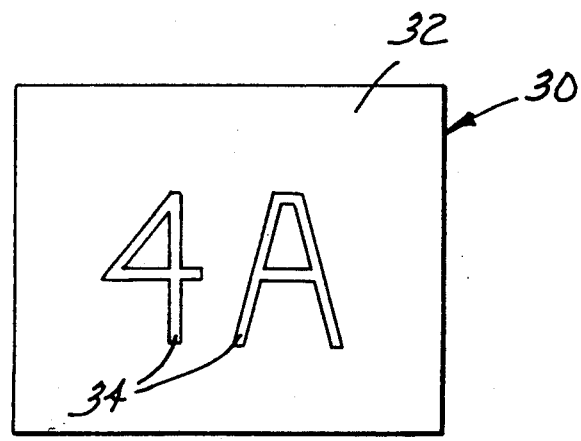
FIG. 3 is a plan view of a sheeting of the invention adhered to a substrate.

FIG. 3 shows article 30 comprising substrate 32, e.g., a rectangular piece of fabric, with two alphanumeric characters 34 made from sheeting of the present invention adhered thereto in the form of a logo. An advantage of the present invention is that, due to its thermoplastic characteristics, web 14 can be used to secure a sheeting of the invention to many substrates by heating. For instance, a hand iron can be used to adhere pieces of a sheeting of the invention to an article of clothing. In many instances, the properties of web 14 are such that it can be heated so as to provide desired adhesion to a substrate without its constituent filaments flowing to such a degree as to reduce the air-permeability of the sheeting below a desired minimum, e g., 0.2 feet$^3$/minute (5 liters/minute) or typically preferably a minimum of 0.5 feet$^3$/minute (14 liters/minute).

Sheetings of the invention may be used in many forms as retroreflective articles. For instance, sheetings of the invention may be used as retroreflective fabric from which vests and overalls are made by simply cutting into appropriate size and shape and optionally sewing pieces together. Because of the high air-permeability and the high flexiblity which may be exhibited by sheetings of the invention, articles made therefrom can be comfortably worn, either alone or over regular clothing, particularly on hot days, e.g., in construction work zones during summer months, thereby enabling wearers to attain higher visibility and hence increasing safety without substantial loss of comfort. In addition, sheetings of the invention are often highly flexible, i.e., having a soft hand, making them more comfortable than stiffer reflective fabrics. Moreover, because sheetings of the invention can be made with desired ambient color, such sheetings can provide enhanced visibility under non-retroreflective conditions as well.

EXAMPLES

The invention will be further explained by the following illustrative examples which are intended to be nonlimiting. Unless otherwise indicated, all amounts are expressed in parts by weight.

Unless otherwise indicated, the following test methods were used.

Retroreflective Brightness

Retroreflective brightness was measured using a retroluminometer as described in U.S. defensive publication T987,003 at observation angles of about 0.2° and entrance angles of about −4°.

Permeability

Frazier Air Permeability, referred to herein as "Permeability", was determined in accordance with ASTM D737.

EXAMPLE 1

Substantially spherical glass microspheres having an average index of refraction of about 1.92, and an average diameter of between about 45 and about 70 microns, were cascaded in a monolayer onto a temporary carrier sheet comprising a sheet of paper coated on one side with low-density polyethylene. The monolayer of microspheres, packed in an essentially hexagonal close-packed arrangement, were embedded into the polyethylene to a depth of about 30 percent of their diameter by heating to about 140° C. The exposed surfaces of the microspheres were then vacuum vapor coated with aluminum to form a substantially hemispheric reflecting layer about 650 to 700 Angstroms thick thereon.

A melt-bonded non-woven web of ethylene vinyl acetate (available from DuPont as EVA 410), having basis weight of 120 grams/meter$^2$, was heat-laminated to the aluminum-coated surfaces of the microspheres using a hand iron with the temperature control set at 150° C. The dwell time for lamination was 8 to 10 seconds. During the lamination process, a layer of release paper was interposed between the iron and the ethylene vinyl acetate web.

Upon cooling, the resultant construction was immediately usable as a retroreflective transfer sheeting with a removable carrier. The exposed surface of the non-woven web could be heat laminated to a variety of substrates by contacting same under hand pressure at about 150° C. for 10 to 15 seconds.

After removing the carrier, the surface of the sheeting having the reflective elements thereon had a pleasing appearance and provided a retroreflectivity of about 500 candelas/lux/meter$^2$. Essentially all of the reflective elements microspheres were transferred from the carrier to the non-woven web. The resultant sheeting had an air-permeability of about 0.2 feet$^3$/minute (5 liters/minute).

EXAMPLE 2

A monolayer of reflective elements partially embedded in a carrier was prepared as in Example 1, except instead of using an aluminum vapor coat, the exposed surfaces of the microspheres were vacuum vapor coated with a layer of sodium aluminum fluoride (Na$_3$AlF$_6$) and then a layer of zinc sulfide (ZnS) as disclosed in U.S Pat. No. 3,700,305.

A melt-blown web made of fluorescent color-dyed polyurethane resin, QUINN PS 200-455 which contains 0.075 percent Hostasol Red GG and 0.075 percent MACROLEX 10GN available from Mobay Co., and having a basis weight of about 63 grams/meter$^2$, was heat laminated to the vapor-coated microspheres at a lamination temperature of about 145° C. and a dwell time of about 15 seconds.

The resulting construction provided a self-adherable retroreflective sheeting. Alphanumeric and other characters were die-cut from the sheeting and heat-laminated at 145° C. with a dwell time of 35 seconds to a non-woven web of filaments of polyurethane resin, QUINN PS 200–440 available from K. J. Quinn, having a basis weight of 100 grams/meter$^2$ and a higher melt temperature.

After stripping away the temporary carrier, the resultant retroreflective sheeting was found to provide a retroreflectivity of about 150 candelas/lux/meter$^2$. The resultant sheeting had an air-permeability of over 10 feet$^3$/minute (280 liters/minute).

Portions of the sheeting were successfully transferred to several fabrics utilizing a Hix HT 400 heat transfer machine which applied a temperature of about 300° F. (150° C.) and a pressure of about 5 to 10 pounds/inch$^2$ (2400 to 4800 Newtons/meter$^2$) for about 10 seconds. The initial air-permeability of the indicated fabrics and air-permeability of the retroreflective portion of the fabric after bonding of the sheeting thereto were as follows:

| Fabric | Initial[1] | Retroreflective[1] |
|---|---|---|
| Oxford[2] | >10 | >10 |
| DACRON[3] | >10 | 0.9 |
| Tricot[4] | >10 | >10 |
| Nylon[5] | >10 | 1.7 |
| Spandex Lycra[6] | >10 | >10 |

[1]Air-permeability in feet$^3$/minute.
[2]Polyester/cotton blend
[3]Polyester
[4]Nylon/polyester blend (6/94 weight ratio).
[5]ANTRON nylon from E. I. du Pont de Nemours.
[6]Segmented polyurethane.

Various modifications and alterations of this invention will become apparent to those skilled in the art without departing from the scope and spirit of this invention.

What is claimed is:

1. A process for making a flexible, self-supporting, air-permeable retroreflective sheeting comprising the following steps:
   a) providing a monolayer of retroreflective elements releasably secured to a temporary carrier sheet;
   b) heat-laminating an air-permeable web of thermoplastic filaments to said retroreflective elements, said filaments softening and flowing sufficiently to bond to said retroreflective elements but not flowing to such an extent that the air-permeability of said web is reduced to below about 5 liters/minute; and
   c) stripping away said carrier sheet.

2. The process of claim 1 wherein said air-permeability is not reduced to below about 14 liters/minute.

3. The process of claim 1 wherein said air-permeability is not reduced to below about 55 liters/minute.

4. The process of claim 1 wherein said filaments have a melt index of between about 2 and about 60.

5. The process of claim 1 wherein said filaments have a melt index of between about 15 and about 30.

6. The process of claim 1 wherein said carrier sheet comprises a thermoplastic layer in which said retroreflective elements are partially embedded.

7. The process of claim 6 wherein providing said retroreflective elements comprises:
   a) cascading a monolayer of microspheres onto the thermoplastic surface of said carrier sheet;
   b) partially embedding said microspheres into said thermoplastic surface by applying heat; and
   c) applying reflective means to the exposed surfaces of said microspheres.

8. The process of claim 7 wherein said reflective means comprises at least one of the following: aluminum, silver, dielectric coating, or flakes of reflective material in a binder layer.

9. The process of claim 1 wherein said web is a nonwoven web.

10. The process of claim 1 wherein said filaments have a melting point between about 40° C. and about 250° C.

11. The process of claim 6 wherein said filaments have a melting point between about 95° C. and about 205° C.

* * * * *

UNITED STATES PATENT AND TRADEMARK OFFICE
CERTIFICATE OF CORRECTION

PATENT NO. : 5,207,852

DATED : May 4, 1993

INVENTOR(S) : Vera L. Lightle et al.

It is certified that error appears in the above-identified patent and that said Letters Patent is hereby corrected as shown below:

On the Title page, under [75] Inventors:, delete the words "all of" in the last line.

In Column 6, Line 15, insert --13-- after the word "Filaments".

In Column 7, Line 5, place a period after "e" in "e g.".

Signed and Sealed this

Twenty-ninth Day of March, 1994

Attest:

BRUCE LEHMAN

Attesting Officer

Commissioner of Patents and Trademarks